Figure 1C:
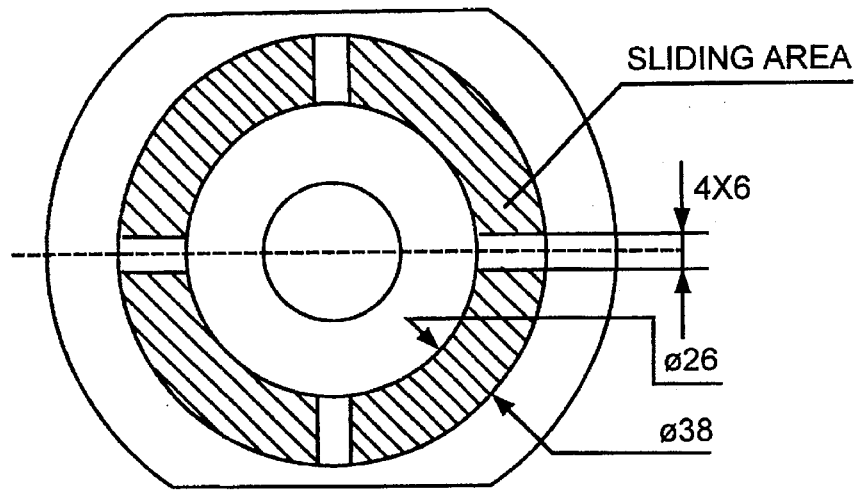

United States Patent [19]
Trabelsi

[11] Patent Number: 5,658,838
[45] Date of Patent: Aug. 19, 1997

[54] ALUMINA-BASED CERAMIC FOR SINTERING, METHOD OF MANUFACTURE AND SLIDING PARTS OBTAINED THEREBY

[75] Inventor: Ridha Trabelsi, Paris, France

[73] Assignee: Norton Desmarquest Fine Ceramics, Vincennes Cedex, France

[21] Appl. No.: 616,434

[22] Filed: Mar. 15, 1996

Related U.S. Application Data

[63] Continuation-in-part of Ser. No. 477,682, Jun. 7, 1995.

[30] Foreign Application Priority Data

Mar. 17, 1995 [FR] France ................................. 95 03130

[51] Int. Cl.$^6$ ................................................. C04B 35/10
[52] U.S. Cl. ................................................. 501/153; 501/127
[58] Field of Search ................................. 501/127, 153

[56] References Cited

FOREIGN PATENT DOCUMENTS

| 497241A1 | 8/1992 | European Pat. Off. |
| 1671095 | 2/1968 | Germany. |
| 2834146 | 2/1980 | Germany. |
| 60-176966 | 9/1985 | Japan ................................. 501/153 |
| 3-21044 | 1/1996 | Japan. |
| 60-176966 | 9/1996 | Japan. |

*Primary Examiner*—Melissa Bonner
*Attorney, Agent, or Firm*—Thomas M. DiMauro

[57] ABSTRACT

The present invention relates to novel alumina-based ceramic composition containing a compound capable of forming a spinel-type aluminate phase detectable by x-ray diffraction, the composition having particular advantage for use as a water faucet seal.

18 Claims, 7 Drawing Sheets

ALUMINA-BASED CERAMIC FOR SINTERING, METHOD OF MANUFACTURE AND SLIDING PARTS OBTAINED THEREBY

This application is a continuation-in-part of copending application Ser. No. 08/477,682 filed on Jun. 7, 1995.

Ceramics based on alumina are very widely used in many sliding applications because of their high hardness, their good resistance to wear and their low cost in comparison with other ceramics (silicon carbide is approximately twice as costly, for example).

One of their most important sliding applications is the manufacture of valve disks for single and dual lever faucets.

The products most widely used in this application at present are aluminas incorporating a sintering additive in the form of alkaline earth (Ca or Mg) silicates. These products are satisfactory when lubricated, but their coefficient of friction is high in the absence of lubrication.

More generally, alumina-based ceramics at present offer sliding performance which varies significantly in time, and deteriorate in ways which can lead to the risk of seizing well before the end of the intended service life of faucet disks made from these ceramics.

Considerable research has been devoted to optimizing lubrication between the disks and their respective geometries, and some progress has been made in this area.

The invention is concerned with the composition of the alumina-based ceramics, however.

The object of the invention is an alumina-based ceramic composition having a moderate sintering temperature (and therefore of moderate cost) which lends itself well when sintered to conventional grinding and polishing treatment and which has a low intrinsic coefficient of friction in the absence of lubricant.

Note that the concept of the intrinsic coefficient of friction is not an intrinsic property of the material: the coefficient of friction between two moving parts depends on the physical and chemical nature of each of the two parts, and also on the respective geometries of the parts and the condition of their surface, the nature of the lubrication (even if this is merely by the hot or cold water) and operating conditions which determine the coefficient of friction. In the remainder of the description the concept of the coefficient of friction assumes prior choice of geometries and operating conditions, lubrication being provided by the water itself. The use of the word "intrinsic" will indicate that the two sliding disks are made from the material in question. The concept of the coefficient of friction also exists for disks made of different materials (in which case the expression "pair of materials" is used, this pair being homogeneous if both the materials are exactly the same).

Accordingly, another object of the invention is an alumina-based ceramic composition having a moderate sintering temperature, which lends itself readily to conventional grinding and polishing treatments and which has a low coefficient of friction in the absence of lubrication, both with itself and with some other alumina-based ceramic compositions, for example a prior art ceramic containing approximately 1% by weight to 2% by weight MgO and 3% by weight to 4% by weight $SiO_2$, the remainder essentially comprising alumina and the usual impurities up to a maximum of 1%.

To this end the invention proposes a ceramic composition for sintering for sliding parts containing:
at least 90% by weight alumina,
1.7% by weight to 2% by weight $Mn_3O_4$,
0.6% by weight to 1% by weight $TiO_2$,
0.5% by weight to 1.5% by weight $SiO_2$,
0.8% by weight to 1.2% by weight CoO,
not more than 1% by weight MgO,
not more than 0.4% by weight $Fe_2O_3$,
the remainder, not more than 0.5% in total, comprising impurities.

In accordance with preferred features of the invention, which are preferably combined:
the alumina content is at least 94%,
the $Mn_3O_4$ content is substantially between 1.7% and 1.8% and the $TiO_2$ content is substantially between 0.8% and 0.9%,
the MgO content is between 0.6% and 0.7%,
the $SiO_2$ is introduced in the form of kaolin or talc,
the CoO content is between 0.8% by weight and 1.2% by weight,
the CoO is introduced in the form of cobalt aluminate or cobalt oxide.

The invention relies on the hypothesis that the coefficient of friction of an alumina/alumina pair can be reduced by integrating into the sintered alumina phases adapted to wear away and then to constitute a layer of solid lubrication between the moving bodies.

Consider, for example, alumina-based ceramic compositions with a sintering temperature in the order of 1350° C. (used among other things for mechanical abutment parts): these compositions usually employ the lamellar structure $MnTiO_3$ phase. This phase is obtained after sintering an alumina-based composition essentially containing manganese oxide and titanium oxide in stoichiometric ratio (approximately 2:1).

However, it has been found that this composition often has mediocre sliding performance. This may be due to its low aptitude for grinding and polishing by the usual industrial methods.

Addition of $SiO_2$ alone appears to favor the formation of a vitreous flux which strengthens the bonds between grains of the alumina matrix. A clear improvement is found after grinding and polishing. However, this material has microcracks around the alumina grains which it appears are due to the presence of the $MnTiO_3$ phase.

The addition of cobalt oxide or cobalt aluminate appears to favor, in conjunction with $SiO_2$, the formation of $MnAl_2O_4$ or $CoAl_2O_4$ type spinel phases, and a phase very similar to cobalt silicate. This has improved the sliding performance of the aluminate; it is thought that this is closely related to the appearance of manganese aluminate $MnAl_2O_4$ and cobalt aluminate at the expense of the $MnTiO_3$ phase.

In addition to their simultaneous presence, the invention teaches ranges of concentrations for the added constituents.

An insufficient quantity of $SiO_2$ (less than 0.5%) appears to result in poor polishing and sliding behavior.

Excessive $SiO_2$ (more than 1.5%) appears to lead to the presence of excessive vitreous phase which makes the material fragile.

Likewise, an insufficient quantity of CoO (less than 0.6%) has the drawback of not allowing formation of the required crystalline phases. It would even seem preferable to require a minimum concentration of 0.8% by weight.

On the other hand, excessive CoO (more than 1.2%) has the drawback of increasing the cost.

Ranges have also been defined for the other constituents.

Insufficient quantities of $Mn_3O_4$ and $TiO_2$ (respectively less than 1.7% and 0.8%) lead to an increase in the sintering temperature.

On the other hand, excessive quantities (greater than 2% and 1%) reduce the performance of the material.

The MgO appears favorable as it favors the formation of spinel phases.

Fe$_3$O$_4$ seems unfavorable.

A few impurities or additives can be tolerated, up to a maximum of 0.5%. These include CaO, Na$_2$O and K$_2$O, the usual impurities in alumina, for example.

Another object of the invention is a method of manufacturing sliding parts having the aforementioned properties.

To this end it proposes a method of manufacturing a sliding part including the step of preparing a composition as defined hereinabove, the step of manufacturing a green part having that composition, and the step of firing under sintering conditions adapted to generate manganese and/or cobalt aluminate phases.

In accordance with preferred features of the invention, possibly combinable:

the composition contains at least 94% alumina, the Mn$_3$O$_4$ content is substantially between 1.7% and 1.8% and the TiO$_2$ content is substantially between 0.8% and 0.9%, the firing step entails heating the green part to a temperature between 1510° C. and 1540° C. for approximately one hour, the SiO$_2$ is introduced in the form of kaolin, for example, the CoO content is between 0.8% and 1.2% by weight, the CoO is introduced in the form of cobalt aluminate, for example, the MgO content is between 0.6% and 0.7% by weight.

The person skilled in the art knows how to determine effective sintering conditions for any composition to be sintered, subject to a small amount of trial and error beforehand. Effective sintering conditions usually achieve sufficient density (typically at least 90% or even 95% of the theoretical maximum density) in combination with a fine and homogeneous particle size (typically less than or equal to 10 microns). The choice of sintering conditions such that this two-fold objective can be achieved seems generally sufficient for the required aluminate phases to be obtained after sintering.

Another object of the invention is a pair of sliding parts that can be used in faucets and that are economical to manufacture and have the lowest possible and most regular coefficient of friction in service.

To this end it proposes a pair of sliding parts at least one of which contains:

at least 90% by weight alumina, 1.7% by weight to 2% by weight Mn$_3$O$_4$, 0.8% by weight to 1% by weight TiO$_2$, 0.5% by weight to 1.5% by weight SiO$_2$, 0.6% by weight to 1.2% by weight CoO, not more than 1% by weight MgO, not more than 0.4% by weight Fe$_2$O$_3$, the remainder, not more than 0.5% in total, comprising impurities, said part having a density at least 90% of the theoretical maximum density and containing an amount detectable by X-rays of manganese aluminate and/or cobalt aluminate phases.

The density is advantageously between 3.79±0.03 and 3.86±0.03, depending on the sintering conditions and the exact composition.

In accordance with preferred features of the invention, which may be combinable:

the alumina content is at least 94%, the Mn$_3$O$_4$ content is substantially between 1.7% and 1.8% and the TiO$_2$ content is substantially between 0.7% and 0.9%, the CoO content is between 0.8% and 1.2%, the MgO content is between 0.6% and 0.7%, the two sliding parts have substantially the same composition, the other sliding part essentially contains between 1% and 2% (preferably between 1% and 1.5%) MgO and 3% to 4% (preferably 3% to 3.5%) SiO$_2$, the remainder being alumina and impurities.

Figure 1B:
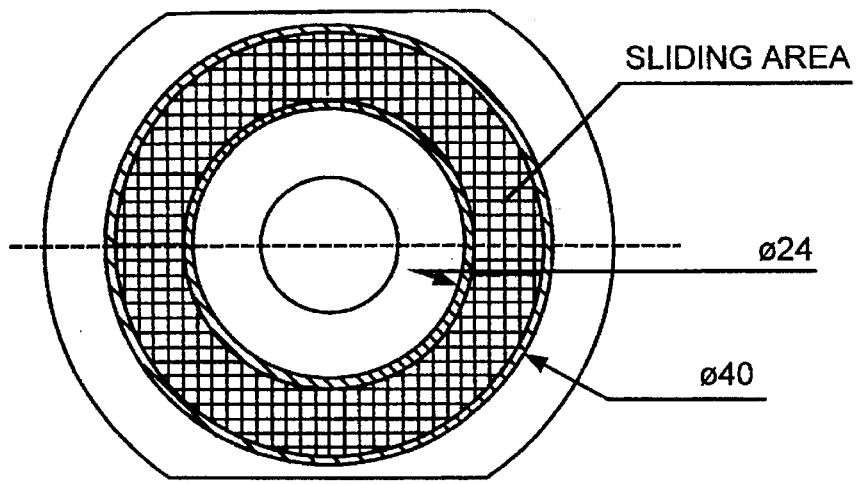
Figure 1A:
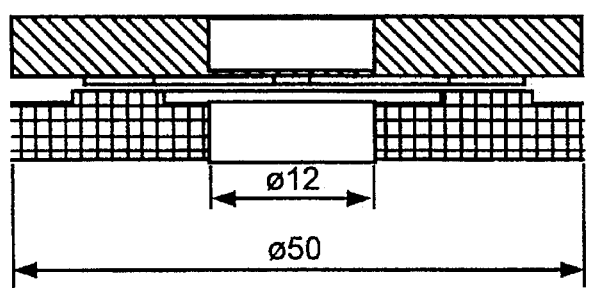
Figure 2:
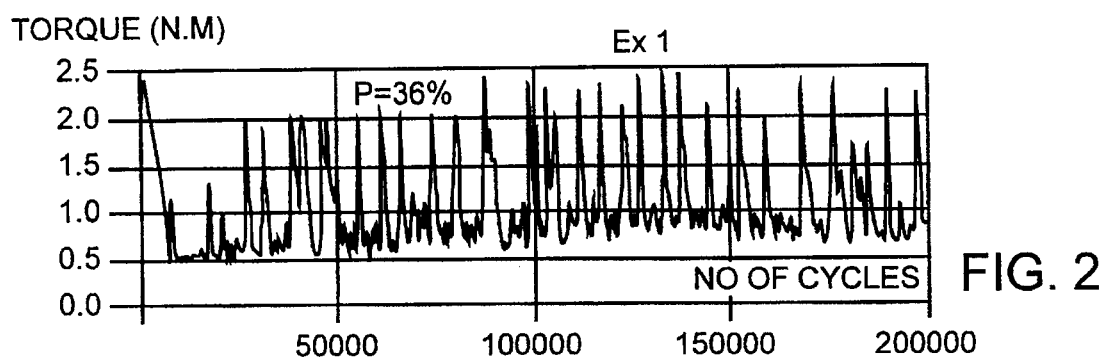
Figure 3:
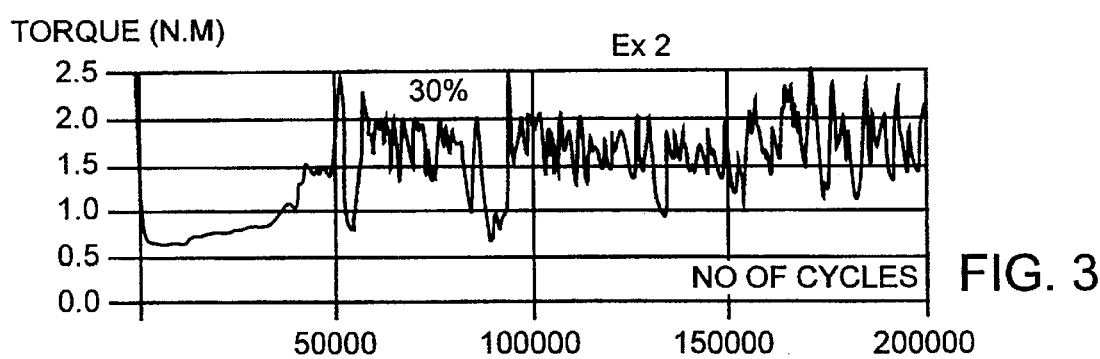
Figure 4:
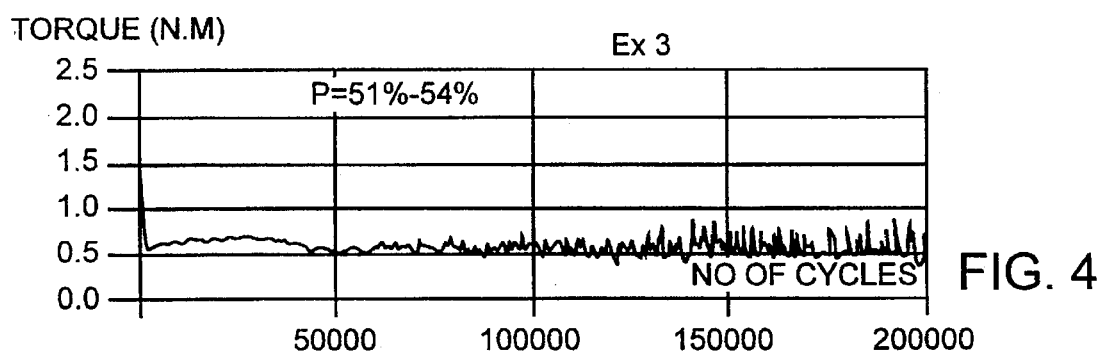
Figure 5:
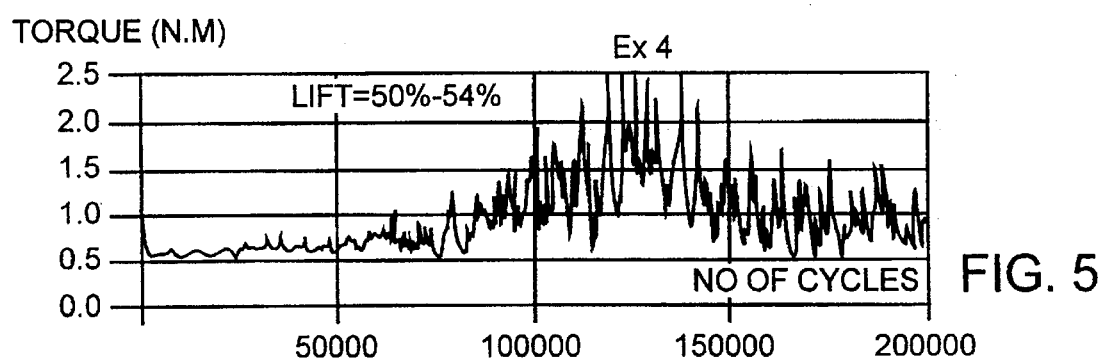
Figure 6:
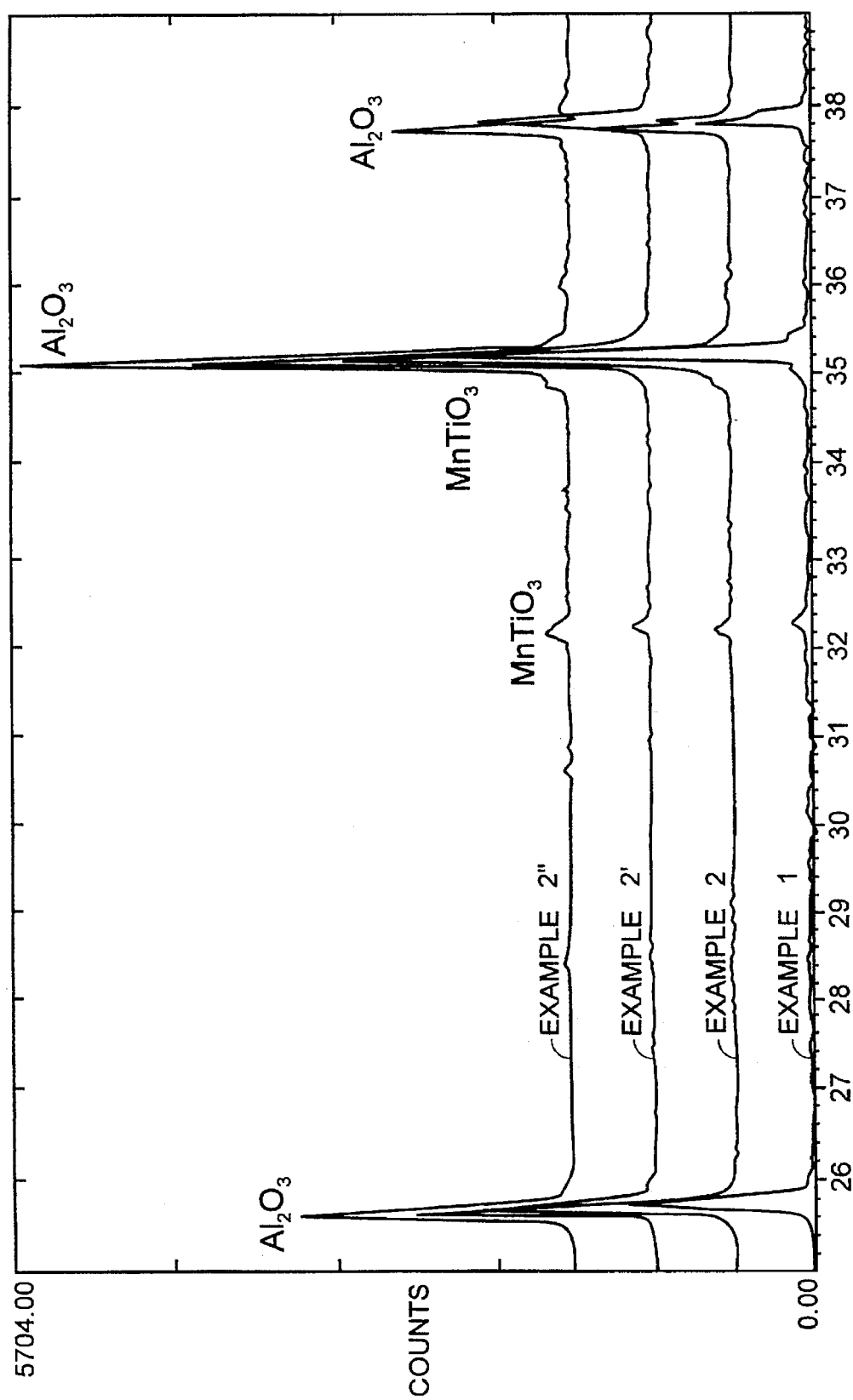
Figure 7:
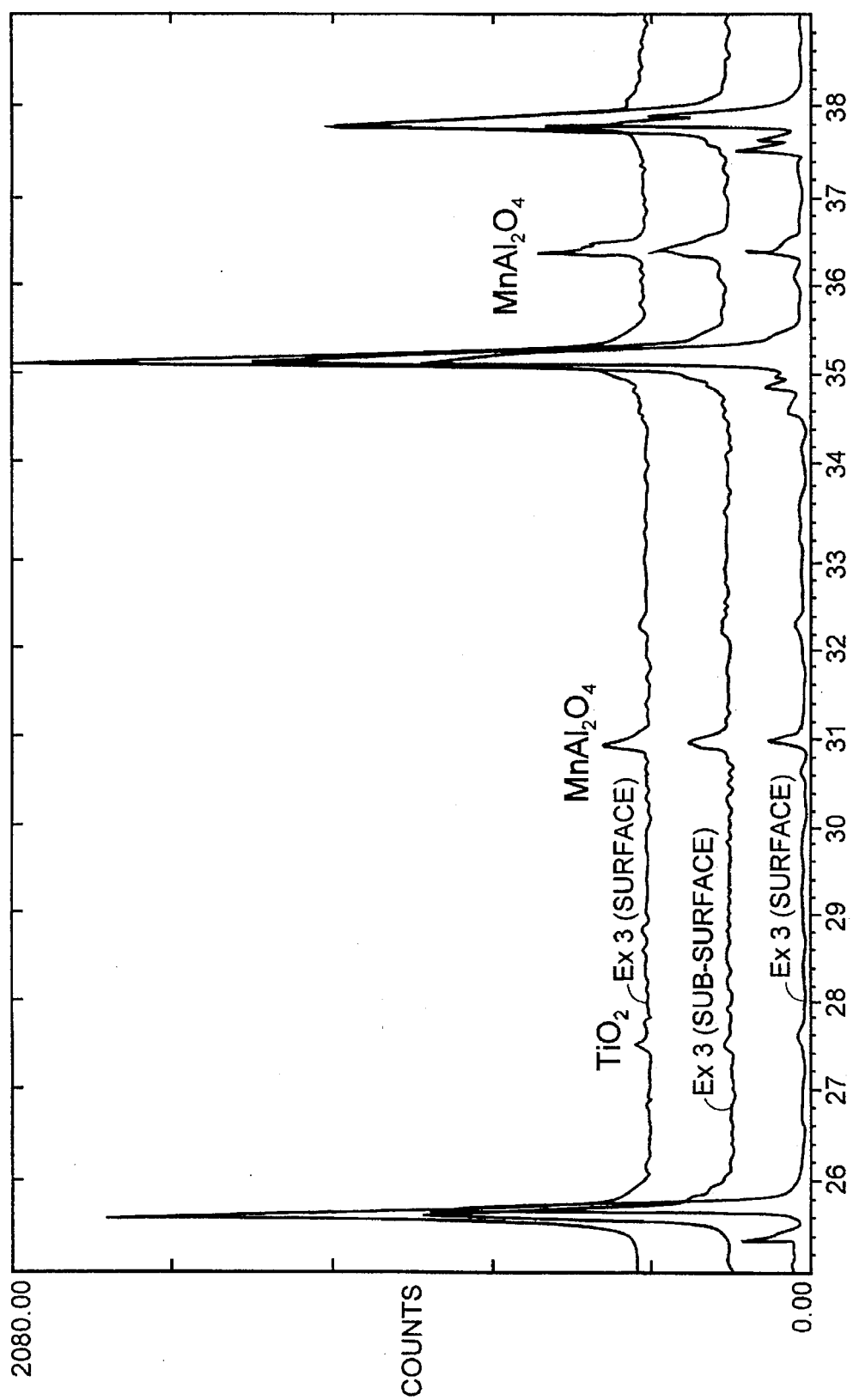
Figure 8:
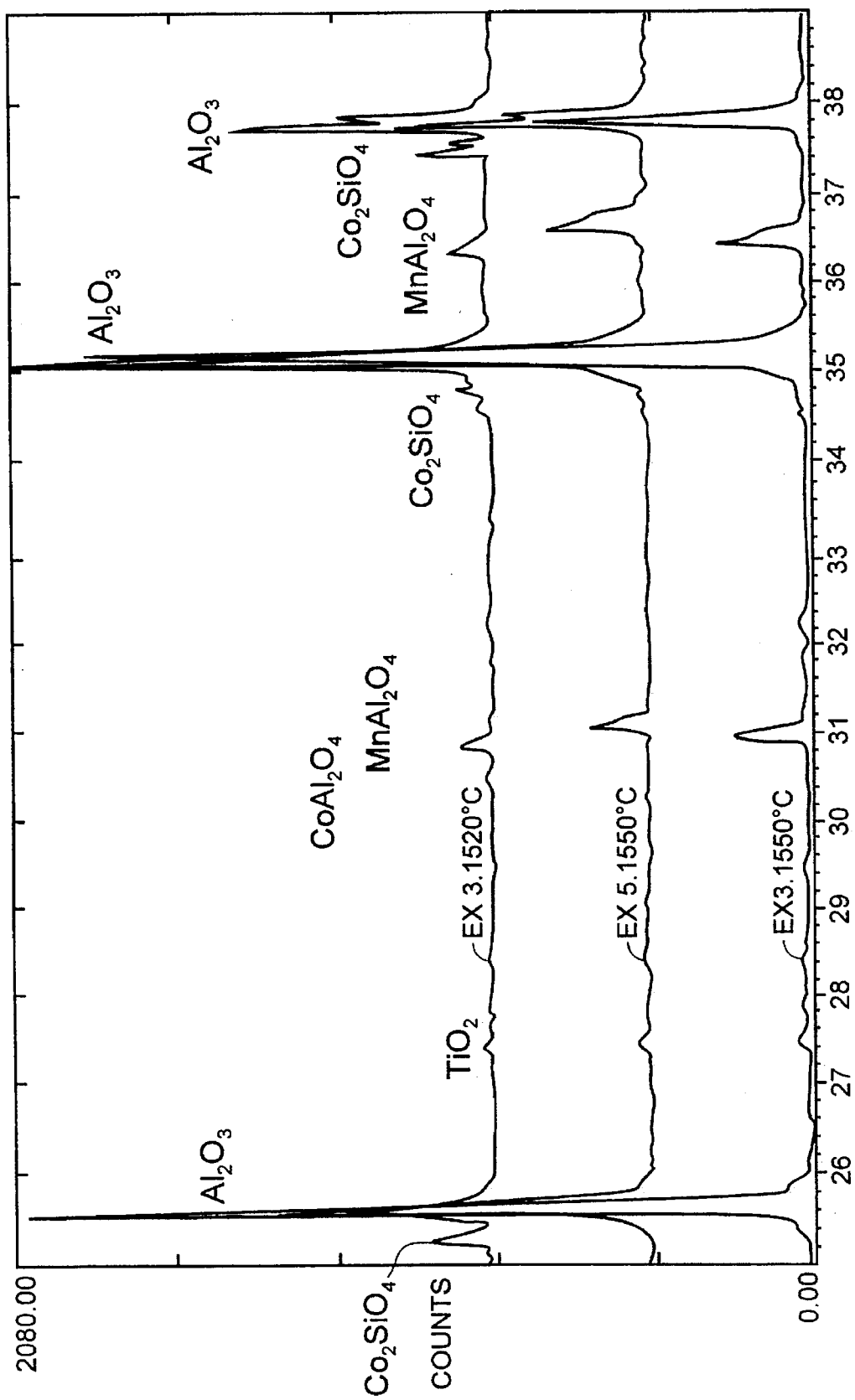
Figure 9:
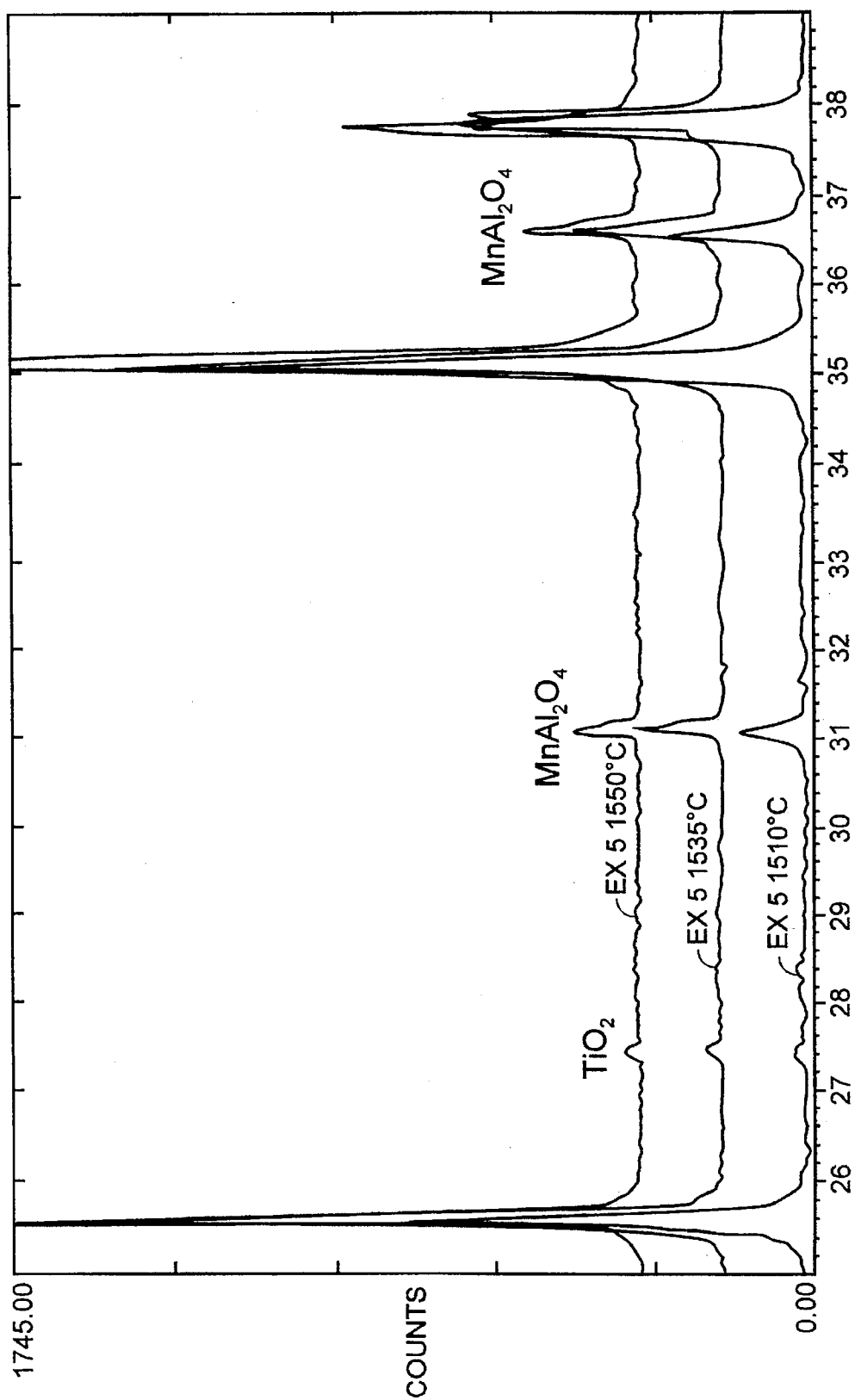
Figure 10:
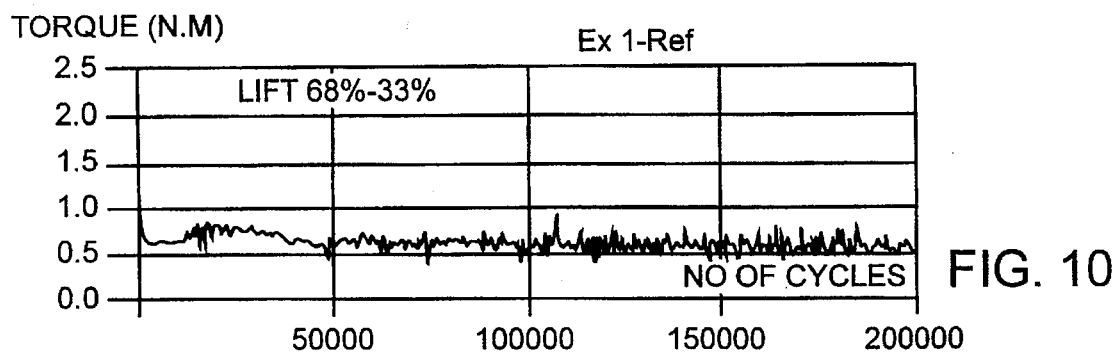
Figure 11:
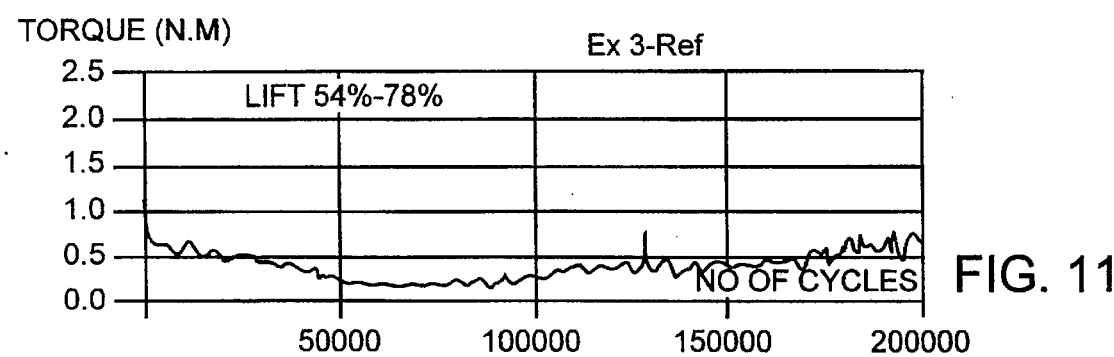
Figure 12:
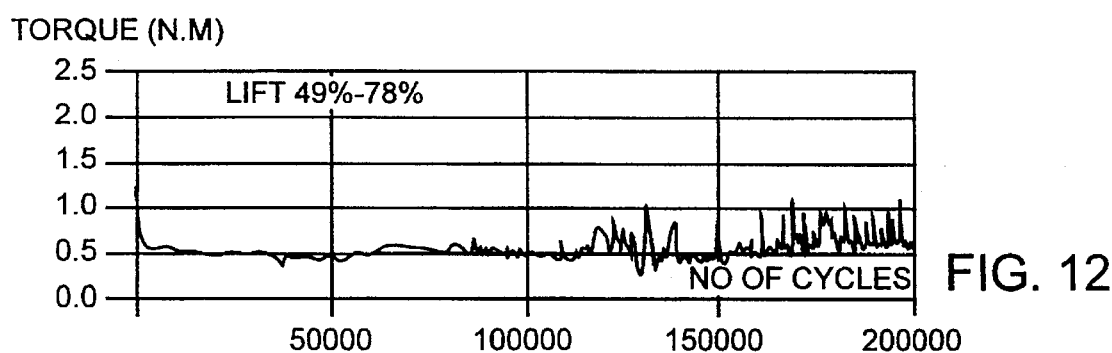
Figure 13:
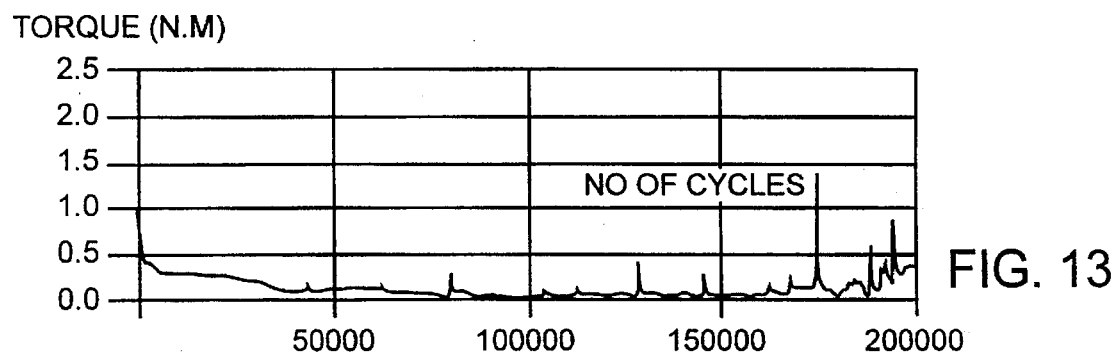

Objects, features and advantages of the invention emerge from the following description given by way of non-limiting example with reference to the appended drawings which:

FIG. 1A is a view in axial section of two parts about to be placed in contact for a sliding test, FIG. 1B is a top view of the bottom part, FIG. 1C is a bottom view of the top part, FIG. 2 is a graph showing the evolution in time of the friction torque between two disks having the composition of example 1, FIG. 3 is a graph corresponding to example 2 in the table, FIG. 4 is a similar graph corresponding to example 3, FIG. 5 is a similar graph corresponding to example 4, FIG. 6 shows X-ray diffraction diagrams for materials from examples 1 and 2, or similar materials, FIG. 7 shows X-ray diffraction diagrams for a material from example 3, at and below the surface of the material, FIG. 8 shows diffraction diagrams for materials from examples 3.and 5, FIG. 9 shows diffraction diagrams for the material from example 5 made at various sintering temperatures, FIG. 10 is a graph showing the evolution in time of the friction torque between a disk made from an ordinary aluminate-based ceramic and a disk with the composition from example 1, FIG. 11 is a similar graph for the composition from example 3, FIG. 12 is a similar graph for the composition from example 4, and FIG. 13 is a similar graph for the composition from example 5.

The sliding characteristics are expressed hereinafter in terms of friction torques measured with disks as shown in FIGS. 1A, 1B and 1C subjected to an alternating rotary movement in cold water (temperature less than 20° C.), at a pressure of 4 bars, with an angular amplitude of ±55°, for 200 000 cycles at a rate of approximately five cycles per minute (this represents a test duration of approximately one month).

In. FIG. 1A the bottom part is fixed and the top part remains concentric with it as it reciprocates. This part is continuous in the circumferential direction whereas the top part is radially smaller (which explains the presence in FIG. 1B of shaded borders flanking the sliding area) and incorporates radial grooves. The contact area is 4.6 cm$^2$ which is entirely comparable with the contact area between faucet disks in real life.

Several compositions have been tested. They are summarized in the appended table.

EXAMPLE 1

An atomized powder was obtained by wet grinding three oxides Al$_2$O$_3$, Mn$_3$O$_4$ and TiO$_2$ in respective proportions of 97.5%, 1.7% and 0.8%. The powder was then compressed and sintered for one hour at a temperature in a range between 1350° C. and 1580° C. (in this example at around 1350° C.) to form test pieces for friction tests (FIGS. 1A, 1B and 1C). X-ray diffraction analysis of the sintered product (see FIG. 6) revealed the presence of the MnTiO$_3$ phase; the formation of manganese aluminate was not detected by this analysis.

The test pieces were then ground and polished (flatness=2 fringes at 0.6 μm wavelength; roughness Ra=0.17 μm to 0.27 μm; measured lift between 23% and 56%) and then friction tested. The friction torque shown in FIG. 2 (with a lift P of 36%) was unstable, with a mean value which exceeded the 0.5 N.m threshold and frequent peaks as high as 1.5 N.m or even 2 N.m.

EXAMPLE 2

An atomized powder was obtained by wet grinding three oxides $Al_2O_3$, $Mn_3O_4$, $TiO_2$ and kaolin (to introduce $SiO_2$) in respective proportions of 96.7%, 1.7%, 0.8% and 0.8% which corresponds to the composition of example 2 in the table since the kaolin comprised approximately ⅔ silica and ⅓ alumina. The powder was then compressed and sintered for one hour at a temperature in a range between 1350° C. and 1580° C. (in this example at 1350° C.) to form test pieces for friction tests. X-ray diffraction analysis of the sintered product (see FIG. 6) revealed the presence of the $MnTiO_3$ phase; the formation of manganese aluminate was not detected by this analysis.

This figure also shows the graph corresponding to a composition 2' differing from the example 2 composition only in that it contained 0.5% more $SiO_2$ and 0.5% less alumina; the figure also shows the graph of a composition 2" corresponding to the same nominal composition as composition 2. These graphs are coincident except for an axial shift which has been introduced to make them separately visible.

The test pieces were then ground and polished (flatness=2 fringes at 0.6 μm wavelength; roughness Ra=0.15 μm to 0.20 μm; lift between 33% and 66%) and then friction tested. The evolution of the friction torque (see FIG. 3) was unstable, with a mean value which exceeded the 0.5 N.m threshold (see FIG. 3) and including many peaks.

EXAMPLE 3

An atomized powder was obtained by wet grinding three oxides $Al_2O_3$, $Mn_3O_4$, $TiO_2$, kaolin and cobalt aluminate $CoAl_2O_4$ to form a product that contained the following proportions of oxides: $Al_2O_3$=96.14%; $Mn_3O_4$=1.7%; $TiO_2$=0.8%; $SiO_2$=0.5%; CoO=0.82%. The powder was then compressed and sintered for one hour at a temperature in a range between 1480° C. and 1580° C. (at 1520° C. in this example) to form test pieces for friction tests. X-ray diffraction analysis of the sintered product (see FIG. 7) showed the formation of manganese aluminate $MnAl_2O_4$ and cobalt aluminate at the expense of the $MnTiO_3$. The analysis showed the presence of free $TiO_2$. This figure shows three graphs corresponding to surface and sub-surface observations: they are highly similar. FIG. 8 shows two graphs corresponding to example 3, for sintering temperatures of 1520° C. and 1550° C. (also, at 1520° C. the CoO was introduced as such while at 1550° C. it was introduced in the form of cobalt aluminate: the graphs are very similar).

The test pieces were then ground and polished (flatness= two fringes at 0.3 μm wavelength; roughness Ra=0.10 μm to 0.15 μm; lift between 48% and 70%) and then friction tested. The evolution of the friction torque was stable in this case (see FIG. 4), the mean value being around 0.5 N.m.

EXAMPLE 4

An atomized powder was obtained by wet grinding three oxides $Al_2O_3$, $Mn_3O_4$, $TiO_2$, kaolin, cobalt aluminate $CoAl_2O_4$ and iron oxide to form a product which contained the following proportions of oxides: $Al_2O_3$=95.8%, $Mn_3O_4$=1.7%; $TiO_2$=0.8%; $SiO_2$=0.5%; CoO=0.54%; $Fe_2O_3$=0.63%. The powder was then compressed and sintered for one hour at a temperature in a range between 1480° C. and 1580° C. (at 1480° C. in this example) to form test pieces for friction tests. X-ray diffraction analysis of the sintered product showed the formation of manganese aluminate $MnAl_2O_4$, cobalt aluminate and iron aluminate at the expense of the $MnTiO_3$ phase.

The test pieces were then ground and polished (flatness= two fringes at 0.3 μm wavelength; roughness Ra=0.15 μm to 0.20 μm; lift between 38% and 60%) and then friction tested. The evolution of the friction torque was unstable beyond 50 000 cycles (see FIG. 5); the mean value significantly exceeded the 0.5 N.m threshold.

EXAMPLE 5

An atomized powder was obtained by wet grinding four oxides $Al_2O_3$, $Mn_3O_4$, $TiO_2$, CoO and talc to form a product that contained the following proportions of oxides: $Al_2O_3$=95.4%; $Mn_3O_4$=1.7%; $TiO_2$=0.8%; $SiO_2$=1.33%; CoO=1%; MgO=0.63%. The powder was then compressed and sintered at a temperature in a range between 1480° C. and 1580° C. (at 1535° C. in this example) to form test pieces for friction tests. X-ray diffraction analysis of the sintered product (see FIG. 9) showed the formation of manganese aluminate $MnAl_2O_4$ and cobalt aluminate at the expense of the $MnTiO_3$ phase. FIG. 9 shows that similar graphs were obtained with different sintering temperatures (FIG. 8 also shows the result for Example 5, sintering temperature 1550° C.).

The test pieces were then ground and polished (flatness= two fringes at 0.3 μm wavelength; roughness Ra=0.09 μm to 0.13 μm; lift between 45% and 70%) and then friction tested. The evolution in the friction torque was stable in this example, the mean value being around 0.4 N.m.

Only homogeneous pairs have been considered until now, i.e. the friction torques considered are those between disks or test pieces made from substantially the same material.

The above compositions were also tested in "heterogeneous sliding", i.e. with a disk made from a different material.

The other, reference material was chosen arbitrarily and essentially contained:

1.35% MgO,
3.5% $SiO_2$, the remainder being alumina and impurities.

FIG. 10 shows that the friction torque between the material from example 1 and the reference material was much more stable than that in FIG. 2. It remained greater than 0.5 N.m, however.

Turning to composition 3, there was also significant progress compared to the homogeneous situation of FIG. 4, up to a mean value of less than 0.4 N.m.

Turning to composition 4, progress was obtained although peaks were still present and the mean value was greater than 0.5 N.m.

Finally, in the case of composition 5, very low torque values were obtained, with a value in the order of 0.3 N.m over a substantial part of the service life (see FIG. 13).

On the other hand, tests in which both disks were made from the reference material yielded friction torques greater on average than those observed for homogeneous pairs using composition 3 or composition 5. These torques were higher than those obtained for the heterogeneous pairs of FIGS. 11 and 13.

said seal further comprising a spinel-type aluminate phase detectable by x-ray diffraction. Preferably, the spinel-type aluminate phase comprises a least one divalent transition metal selected from the group consisting of cobalt, nickel, iron, chromium, and copper.

| | Al$_2$O$_3$ wt % | Mn$_3$O$_4$ wt % | TiO$_2$ wt % | SiO$_2$ wt % | CoO wt % | MgO wt % | Fe$_2$O$_3$ wt % | Temperature °C. | Sp gr g/cm$^2$ | Aluminates | Silicates | Titanates | Friction torque |
|---|---|---|---|---|---|---|---|---|---|---|---|---|---|
| 1 | 97.5 | 1.7 | 0.8 | — | — | — | — | 1350 | 3.81 | — | | Mn (++) | >0.5 |
| 2 | 97 | 1.7 | 0.8 | 0.5 | — | — | — | 1350 | 3.82 | — | | Mn (++) | >0.5 |
| 3 | 96.14 | 1.7 | 0.8 | 0.5 | 0.82 | — | — | 1520 | 3.89 | Mn, Co | Co | Mn (+) | ~0.5 |
| 4 | 95.8 | 1.7 | 0.8 | 0.5 | 0.54 | — | 0.63 | 1480 | 3.86 | Mn, Co, Fe | | Mn (+) | >0.5 |
| 5 | 94.5 | 1.7 | 0.8 | 1.33 | 1 | 0.63 | — | 1535 | 3.81 | Mn, Co | | Mn (+) | ~0.4 |
| INV | >90 | 1.7–2 | 0.8–1 | 0.5–1.5 | 0.6–1.2 | ≤1% | ≤0.4 | 1510° C. to 1550° C. | 3.79 to 3.86 ±0.03 | Mn, Co | Co preferred | | ≤0.5 |

Accordingly, examples 3 and 5 show progress over the reference material and, in combination with the latter, yield friction torques lower than those obtained under similar conditions with prior art aluminas. Examples 1, 2 and 4 were of less benefit, however. Comparing the two groups of examples leads to the definition given at the foot of the table regarding the chemical analysis of a composition in accordance with the invention, and certain features of the sintered product made from that composition (there is no significant change in chemical analysis during sintering). Quantifying the aluminate phases is difficult; it nevertheless appears that the benefits of the invention are obtained if the amount of those phases is significant (visible peaks in X-ray diffraction, for example) in combination with compliance with the chemical analysis conditions specified (in particular the iron oxide content).

It goes without saying that the foregoing description has been given by way of non-limiting example only and that numerous variants can be suggested by the person skilled in the art without departing from the scope of the invention.

It is also clear that the foregoing description has been given by way of non-limiting example of ceramics containing spinel type aluminate only and that numerous variants of such ceramics containing spinel type aluminates can be used by the person skilled in the art without departing from the scope of the invention. For example, it is believed that other divalent transition metals such as nickel, iron, chromium and copper may be substituted for cobalt with similar results.

Therefore, in accordance with the present invention, there is also provided a ceramic composition for sintering into friction parts, comprising:

a) at least 90% be weight ("w/o") alumina, b) 1.7 w/o to 2 w/o Mn3O4, c) 0.8 w/o to 1 w/o TiO2, d) 0.5 w/o to 1.5 w/o SiO2, e) 0.6 w/o to 1.2 w/o of a compound capable of forming a spinel-type aluminate phase in an mount detectable by x-ray diffraction, f) not more than 1 w/o MgO, g) not more than 0.4 w/o Fe2O3, and h) the remainder, being not more than 0.5 w/o in total, comprising impurities.

Also in accordance with the present invention, there is provided a water faucet seal comprising:

a) alumina, b) titania, and c) Mn3O4,

I claim:

1. A ceramic composition for sintering into parts, containing:

at least 90% by weight alumina, 1.7% by weight to 2% by weight Mn$_3$O$_4$, 0.8% by weight to 1% by weight TiO$_2$, 0.5% by weight to 1.5% by weight SiO$_2$, 0.6% by weight to 1.2% by weight of a compound, exclusive of Mn$_3$O$_4$ and Fe$_2$O$_3$, capable of forming a spinel aluminate phase in an amount detectable by x-ray diffraction, not more than 1% by weight MgO, not more than 0.4% by weight Fe$_2$O$_3$, and the remainder, being not more than 0.5 w/o in total, comprising impurities.

2. The ceramic composition according to claim 1 characterized in that the alumina content is at least 94%.

3. The ceramic composition according to claim 1 characterized in that the Mn$_3$O$_4$ content is substantially between 1.7% and 1.8% and the TiO$_2$ content is substantially between 0.8% and 0.9%.

4. The ceramic composition according to claim 1 characterized in that the MgO content is between 0.6% and 0.7%.

5. The ceramic composition according to claim 1 characterized in that the SiO$_2$ is introduced in the form of kaolin or talc.

6. A method of manufacturing a sliding part, comprising the steps of: a) preparing a ceramic powder composition containing:

at least 90% by weight alumina, 1.7% by weight to 2% by weight Mn$_3$O$_4$, 0.8% by weight to 1% by weight TiO$_2$, 0.5% by weight to 1.5% by weight SiO$_2$, 0.6% by weight to 1.2% by weight of a compound, exclusive of Mn$_3$O$_4$ and Fe$_2$O$_3$, capable of forming a spinel aluminate phase in an amount detectable by x-ray diffraction, not more than 1% by weight MgO, not more than 0.4% by weight Fe$_2$O$_3$, the remainder, not more than 0.5% in total, comprising impurities, b) manufacturing a green part from the composition, and c) firing the green part under sintering conditions selected to provide a density of at least 90% of the maximum theoretical density and generate at least one spinel aluminate phase in an amount detectable by x-ray diffraction.

7. Method of manufacture according to claim 6 characterized in that the composition includes at least 94% alumina.

8. Method of manufacture according to claim 6 characterized in that the $Mn_3O_4$ content is substantially between 1.7% and 1.8% and the $TiO_2$ content is substantially between 0.8% and 0.9%.

9. Method of manufacture according to claim 8 characterized in that the firing step consists in heating the green part to a temperature between 1 510° C. and 1 540° C. for approximately one hour.

10. The method of manufacture according to claim 6 characterized in that the $SiO_2$ is present in the ceramic powder composition as at least one of kaolin or talc.

11. Method of manufacture according to claim 6 characterized in that the MgO content is between 0.6% by weight and 0.7% by weight.

12. A sliding apparatus comprising first and second sliding components, each sliding component having a surface, the sliding components being juxtaposed so that at least a portion of the surface of the first sliding component can slide upon at least a portion of the surface of the second sliding component, wherein the first sliding component contains:

at least 90% by weight alumina, 1.7% by weight to 2% by weight $Mn_3O_4$, 0.8% by weight to 1% by weight $TiO_2$, 0.5% by weight to 1.5% by weight $SiO_2$, 0.6% by weight to 1.2% by weight of a compound, exclusive of $Mn_3O_4$ and $Fe_2O_3$, capable of forming a spinel aluminate phase in an amount detectable by x-ray diffraction, not more than 1% by weight MgO, not more than 0.4% by weight $Fe_2O_3$, the remainder, not more than 0.5% in total, comprising impurities, the first sliding component having a density of at least 90% of the theoretical maximum density and containing a spinel aluminate phase in an amount detectable by x-ray diffraction.

13. The apparatus of claim 12 characterized in that the alumina content is at least 96%.

14. The apparatus of claim 12 characterized in that the $Mn_3O_4$ content is between 1.7% and 1.8% and the $TiO_2$ content is between 0.7% and 0.9%.

15. The apparatus of claim 12 characterized in that the MgO content is between 0.6% and 0.7%.

16. The apparatus of claim 12 characterized in that the two sliding components have substantially the same composition.

17. The apparatus of claim 12 characterized in that the second sliding component essentially contains between 1% and 2% MgO and between 3% and 4% $SiO_2$, the remainder being alumina and impurities.

18. The apparatus of claim 12 characterized in that the MgO content is between 1% and 1.5% and the $SiO_2$ content is between 3% and 3.5%.

* * * * *